(No Model.)
C. M. RYDER.
SAFETY PRESSURE GAS REGULATOR.
No. 411,875. Patented Oct. 1, 1889.
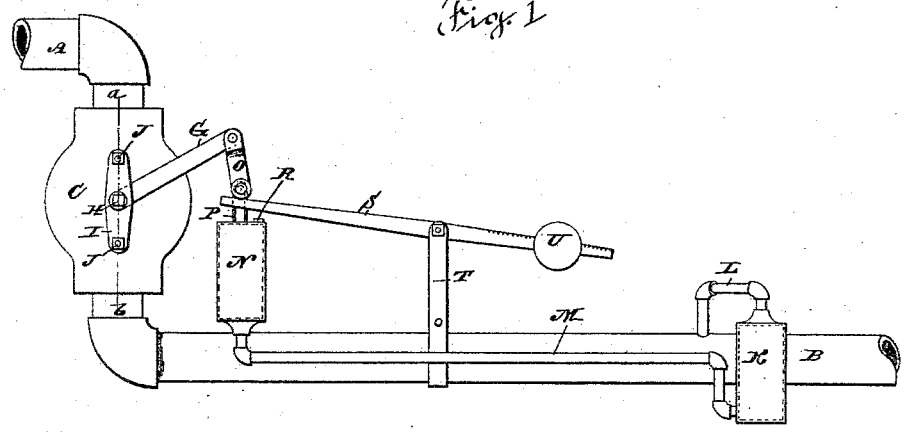
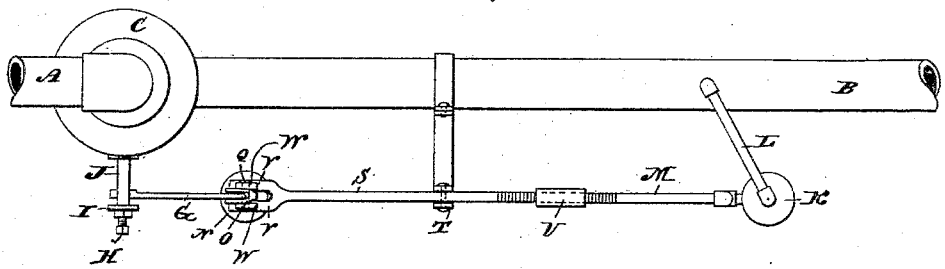
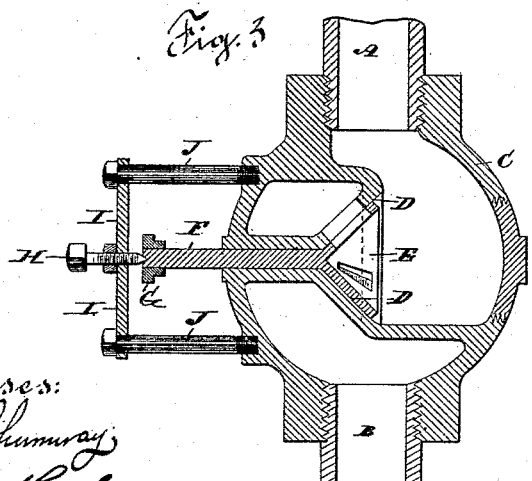
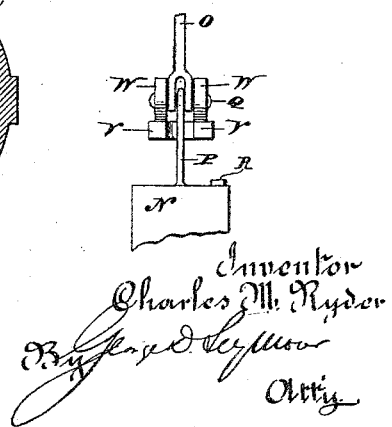
Witnesses:
Chas. B. Shumway
Harry Hall
Inventor
Charles M. Ryder
By Geo. D. Seymour
Atty

UNITED STATES PATENT OFFICE.

CHARLES M. RYDER, OF FINDLAY, OHIO.

SAFETY-PRESSURE GAS-REGULATOR.

SPECIFICATION forming part of Letters Patent No. 411,875, dated October 1, 1889.

Application filed January 4, 1889. Serial No. 295,431. (No model.)

*To all whom it may concern:*

Be it known that I, CHARLES M. RYDER, residing at Findlay, in the State of Ohio, have invented certain new and useful Improvements in Safety-Pressure Gas-Regulators; and I do declare the following to be a full, clear, and exact description of the same, reference being had to the accompanying drawings, which form a part of this specification.

My invention relates to an improvement in safety pressure-regulators especially designed for use in connection with a system for a public service of natural gas, the object being to produce a regulator which shall not only conform to ordinary variations in the pressure, but protect the consumer against accidents growing out of shutting off the gas without his knowledge or overpressure.

With these ends in view my invention consists in a valve controlled and opened and closed by the shifting of a body of fluid which is moved by the pressure of the gas on the outlet side of the valve and by gravity, and in certain details of construction and combinations of parts, as will be hereinafter described, and pointed out in the claims.

In the accompanying drawings, Figure 1 is a view in side elevation of one form which a safety pressure-regulator embodying my invention may assume. Fig. 2 is a plan view thereof. Fig. 3 is an enlarged view of the valve on the line $a\,b$ of Fig. 1; and Fig. 4 is a view of the connection between the movable fluid-chamber, the rock-arm of the valve, and the weighted lever.

As herein shown, the inlet-pipe A, which is in communication with a gas-main, and the outlet-pipe B, which distributes the gas for direct use, are respectively connected with the opposite ends of a casing C, inclosing a perforated conical valve-seat D, upon which a hollow conical valve E, having corresponding perforations, rests, such valve having a spindle F, carrying a spindle-arm G, and supported at its outer end by a set-screw H, mounted in a plate I, secured to arms or posts J J, offsetting from the said casing. A stationary fluid-chamber K, having communication with the outlet-pipe through a small pipe L, leading therefrom into its upper end, is connected at its lower end through a small flexible or jointed pipe M with the lower end of a similar but movable chamber N, suspended from the outer end of the spindle-arm G, before mentioned, by means of a link O, pivoted to such arm, and a staple P, secured to the upper end of the chamber and coupled with the lower end of the link by means of a pin Q, passing transversely through the lower end thereof. A vent R, formed in the upper end of the movable chamber, is provided for the egress of air when the fluid is being forced into such chamber and ingress of air when the fluid is flowing out of it, whereby the compression of the air is avoided on the one hand and the creation of a vacuum on the other hand. A horizontal lever S, fulcrumed in the upper end of a standard T, bolted to the outlet-pipe, is graduated at one end and provided with an adjustable weight U and at the other end with a fork V, which embraces the staple and passes under two anti-friction rolls W W, respectively located on the opposite ends of the pin Q. The said chambers are arranged so that the lower end of the movable chamber will be about on a level with the upper end of the stationary chamber when the valve is closed, with the spindle-arm in its highest position.

In using the device a body of fluid is introduced into the chambers, between which it is free to flow through the flexible pipe connecting them. The amount of fluid used will depend on its specific gravity and the character of the valve to be operated. By preference I employ mercury, but do not limit myself to any particular fluid.

The device is set so that under the average pressure of gas the fluid will be sustained in a state of about equal division between the two chambers. Then, if the pressure drops a little in the outlet-pipe, the pressure on the fluid will be proportionately relieved, and enough fluid will gravitate from the movable chamber into the stationary chamber to sufficiently lighten the former to permit the weight to lift it, and hence the valve-arm, so as to open the valve wider and correct the variation in pressure by letting enough more gas pass the valve to make up for the loss of pressure. Just as soon now as the pressure is restored to its normal point so much fluid as flowed from the movable chamber into the stationary chamber will be forced back into the movable chamber, which will be then restored to its former position, and together with it the valve-arm and valve. When, on the other hand, the pressure rises slightly above the average pressure, sufficient fluid will be forced from the stationary chamber to the movable chamber to pull the latter, and hence the valve-arm, down by the increase of weight in such chamber, and so close the valve enough to prevent much increase of pressure and keep the amount of gas passing into the outlet-pipe nearly constant. Then when the pressure falls again to its normal point so much fluid as was forced into the movable chamber by the increase of pressure in the outlet-pipe will flow back into the stationary chamber and permit the weight to lift the movable chamber and valve-arm to their normal positions. It will thus be seen that the fluctuations of pressure in the gas-supply at once act through the movable fluid to operate the valve in compensatory action, as described, so that although variations of pressure occur in the gas-main the pressure of gas passing through the outlet-pipe will be nearly constant. In case the gas should be entirely shut off in the gas-main, the pressure upon the fluid will be entirely relieved. All of the fluid in the movable chamber will then at once gravitate into the stationary chamber, leaving the movable chamber so light that it is overbalanced by the weight and lifted until its lower end is about on a level with the upper end of the stationary chamber. The corresponding movement of the valve-arm rotates the valve so as to entirely close it. It will thus be seen that the shutting off of the gas in the gas-main is followed by the automatic closing of the valve opening into the outlet or distributing pipe. In the changed position of its movable parts the regulator acts as a visual indicator to signal to the consumer that the gas has been shut off in the main line. Now although the gas may be turned on in the main line none will pass into the outlet-pipe until the consumer has manually opened the valve by lifting the weighted lever, which he must hold in an elevated position against the weight of the adjustable weight until the pressure of the gas thus let into the outlet-pipe, and hence into the stationary chamber, has forced enough liquid into the movable chamber to balance the weight and hold the valve-arm down in position to keep the valve open. It will be evident from the foregoing that the device constitutes a perfect safeguard against accident due to shutting off the gas in the gas-main and turning it on again without the consumer's knowledge, for the removal of pressure caused by shutting off the gas in the main line effects the shutting off of the gas in the distributing-connection in such manner that the consumer must turn it on again personally. In case there should be a dangerous overpressure of gas, the entire amount of fluid will be forced into the movable chamber, which will then overbalance the weight and pull down the valve-arm, so as to entirely close the valve; but as the pressure reduces the fluid will flow back into the stationary chamber and permit the weight to lift the movable chamber and arm, and thus automatically open the valve. My improved safety pressure-regulator has therefore the threefold function of compensating for variations of pressure in the ordinary use of the gas, in shutting off the gas, so that it must be turned on again personally by the consumer when it is turned off in the main line, and, also, in shutting it off entirely when the pressure is so excessive as to be dangerous or inconvenient.

It is apparent that in carrying out my invention some departure from the construction shown and described may be made. I would therefore have it understood that I do not limit myself to such form, but hold myself at liberty to make such changes and alterations as fairly fall within the spirit and scope of my invention.

Having fully described my invention, what I claim as new, and desire to secure by Letters Patent, is—

1. The combination, with a valve, of a movable fluid-chamber mechanically connected therewith, a balance for such chamber, and pressure communication between the outlet side of the valve and such chamber, a body of fluid being shifted by the forces of pressure and gravity to act on the balance, and so move the chamber, and hence the valve, substantially as set forth.

2. The combination, with a valve, of a movable fluid-chamber mechanically connected therewith, a balance for such chamber, a stationary fluid-chamber communicating with the outlet side of the valve and located at a lower level than the movable chamber, and a flexible pipe connecting the two chambers, a body of fluid being forced into the movable chamber by pressure and running out of it by gravity to disturb its balance and move it, and so operate the valve, substantially as set forth.

3. The combination, with a valve, of a movable fluid-chamber mechanically connected therewith, a weighted lever connected with the chamber so as to balance it, a stationary fluid-chamber communicating with the outlet side of the valve and located at a lower level than the movable chamber, and a flexible pipe connecting the two chambers, a body of fluid being forced into the movable chamber by pressure and running out of it by gravity to disturb its balance and move it, and so operate the valve, substantially as set forth.

In testimony whereof I have signed this specification in the presence of two subscribing witnesses.

CHARLES M. RYDER.

Witnesses:
CHAS. B. SHUMWAY,
HARRY HALL.